F. LEDERER.
AUTOMOBILE BUMPER.
APPLICATION FILED OCT. 26, 1916.
1,216,332.
Patented Feb. 20, 1917.
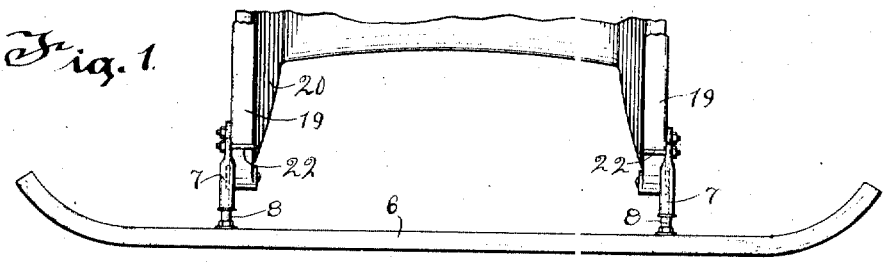
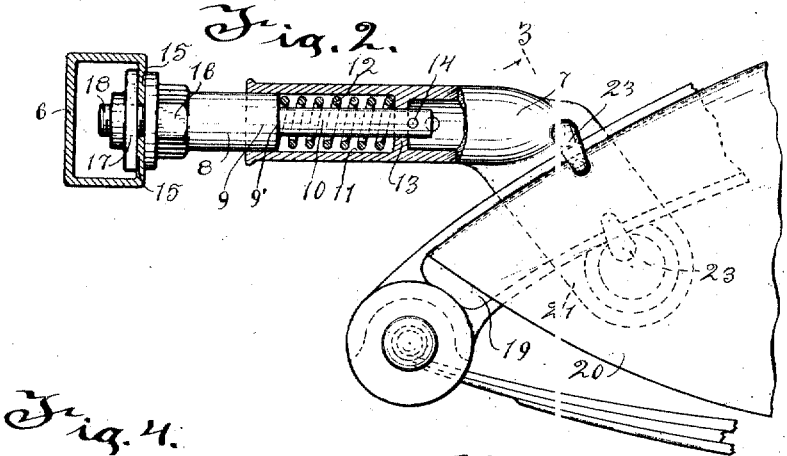
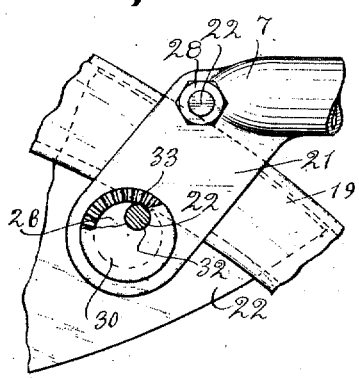
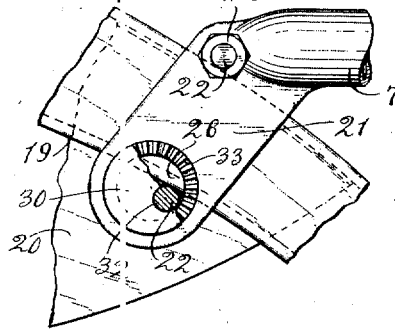
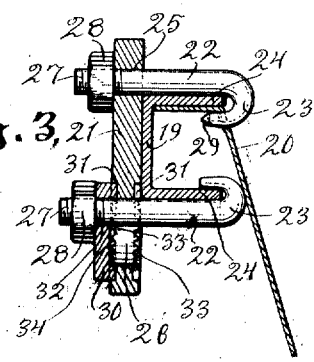
INVENTOR
Friedrich Lederer
By Morsell, Keeney & French
ATTORNEYS

UNITED STATES PATENT OFFICE.

FRIEDRICH LEDERER, OF MILWAUKEE, WISCONSIN, ASSIGNOR OF ONE-HALF TO BENJAMIN D. ZIMMERMANN, OF CHICAGO, ILLINOIS.

AUTOMOBILE-BUMPER.

1,216,332.  Specification of Letters Patent.  Patented Feb. 20, 1917.

Application filed October 26, 1916.  Serial No. 127,781.

*To all whom it may concern:*

Be it known that I, FRIEDRICH LEDERER, a citizen of the United States, and resident of Milwaukee, in the county of Milwaukee and State of Wisconsin, have invented new and useful Improvements in Automobile-Bumpers, of which the following is a description, reference being had to the accompanying drawings, which are a part of this specification.

This invention relates to automobile bumpers.

The invention is designed more particularly to provide a new and improved means for attaching the bumper to an automobile.

In the present construction of automobiles there is a mud apron located at the front of the machine and connected at its sides to the side bars or side frame members of an automobile and with the usual construction of bumper brackets and their attaching means it is necessary to drill or cut holes in the mud apron to attach the bumper in place. In the present construction the bumper is readily attached to the automobile without the necessity of drilling or cutting holes in the mud apron or in the side bar preparatory to putting on the bumper and avoiding any weakening of the frame by drilling or cutting holes therethrough.

The invention is further designed to provide a one piece bumper bracket with fastening means which may be adjusted so as to adjust the bracket and bumper bar in proper horizontal position regardless of the variations in curvature and depth of the front side bars to which the bumper may be attached.

The invention further consists in the several features hereinafter set forth and more particularly defined by claims at the conclusion hereof.

In the drawings:

Figure 1 is a plan view of the bumper showing it applied to the front portion of the side bars of an automobile;

Fig. 2 is a detail side view of the device, parts being broken away and parts being shown in section;

Fig. 3 is a section taken on the line 3—3 of Fig. 2;

Fig. 4 is a detail view of the bracket showing its attachment to the side bar parts being shown in section and parts being broken away;

Fig. 5 is a view similar to Fig. 4 showing the bracket attached to a side bar of different curvature from that shown in Fig. 4.

In general the bumper comprises a bumper bar 6, supporting brackets 7, and means for yieldingly connecting said bar to said brackets.

The means for yieldingly connecting the bar 6 to the brackets 7 consists of slidable rods or plungers 8 having portions 9 and 10 fitting within the tubular portion 11 of the brackets 7, an adjustable connection between the rods 8 and 6, and a spring 12 surrounding the portion 10 of the rod 8 and interposed between the shouldered portion 9' of said rod and an annular flange 13 in the tubular portion 11, the outward movement of the rods 8 being limited by pins 14.

The adjustable connection between the rods 8 and the bar 6 for adjusting the bumper to different widths of frame and the type of bar may be of any desired form but I prefer to use a channel bumper bar provided with inwardly extending flanges 15 which are clamped to the arms 8 by means of a nut 16 formed on the arm adjacent the outside of the flanges 15 and a nut 17 having threaded engagement with the threaded portion 18 of the arm, the flanges 15 being clamped between the nuts 15 and 16. This manner of adjustably connecting the bar to the arms provides a bar with a smooth contacting surface so that objects may be readily deflected from it if they strike at an angle thereto and produces a neat appearing construction due to the connection being located at the rear of the bar.

In the drawings I have illustrated the usual form of the front end of the automobile with the forwardly projecting side bars 19 and the metal mud apron 20 disposed therebetween and connected thereto and the principal object of this invention is the means for readily attaching the bumper to automobiles of this construction.

This means consists of the brackets 7 and means for clamping said brackets to the forward portion of the side bars 19 without the necessity of drilling or cutting holes in said side bars or of drilling or cutting holes in the mud apron preparatory to securing the bumper in position.

Each bumper is provided with a part 21 adapted to rest against one side, preferably the outer side of the side bar and the means for securing said bracket to the side bar consists of upper and lower bolts 22 having hooked ends 23 adapted to engage the flanges 24 of the side bar, said bolts respectively passing through apertures 25 and 26 in the bracket and having threaded ends 27 for receiving nuts 28 to clamp the parts together. The upper bolt has a point 29 at the end of the hook so that when its nut 28 is tightened up to clamp the bracket in place, said pointed hook will pierce the mud apron 20 adjacent the side bar 19 and pass through the same, as shown in Fig. 3 so that it is not necessary to drill or cut the mud apron preparatory to putting on the bumper as this is done simultaneously with the fitting on of the brackets.

While no provision for the adjustment of the bolts 22 need be made for the same type of automobiles or automobiles in which the side bars have the same degree of curvature at their forward ends provision has been made for varying the position of the lower bolt 22 to adapt the bracket to side frame members of varying curvature and varying depth. This means consists of an adjustable circular lock plate 30 adapted to be seated in either of the circular recesses 31 on the sides of the portion 21 of the bracket and concentrically disposed with respect to the aperture 26, there being two recesses in order that the brackets may be interchangeably used on either the right or left side of the vehicle, said circular plate being provided with an eccentrically disposed aperture 32 through which the lower bolt 22 passes. The lock plate 30 is secured in different positions of adjustment with respect to the bracket by means of a tooth engagement between the parts, there being a plurality of radially disposed teeth 33 on the bracket 7 within the recesses 31 thereof adapted to interlock with corresponding teeth 34 on the lock plate. By adjusting the position of the plate 30 with respect to the bracket 7 the position of the lower bolt 22 may be varied with respect to the position of the upper bolt 22 owing to the eccentric disposition of said lower bolt in said plate and in this way the bracket and bar may be adjusted to proper horizontal position regardless of the curvature and depth of the side bars.

While the horizontal adjustment of the bar may be used it will be understood that the pointed hook bolt may be employed on the bracket in connection with other fastening means and the device used on automobiles having a mud apron.

With the construction of bumper above described the shock of impact will be transmitted from the bar and brackets through the fastening means to the frame of the automobile, the springs serving to absorb the lighter shocks.

What I claim as my invention is:

1. The combination, with the side bars and front mud apron of an automobile, of an automobile bumper having bumper brackets, and means for clamping each of said brackets to the side bar including a clamping member having a part extending through the mud apron, said part adapted to pierce the mud apron during the attachment of the brackets to said side bar.

2. The combination, with the side bars and front mud apron of an automobile, of an automobile bumper provided with bumper brackets, and means for clamping said brackets to said side bars including a pointed hooked member for engaging the side bar and piercing the mud apron during the attachment of the brackets to said side bar.

3. The combination, with the side channel bars of an automobile, of a bumper provided with brackets, and means comprising hooked bolts for engaging the flanges of said bars to clamp said brackets thereto, one of said bolts having a pointed end to pierce the mud apron during the attachment of the brackets to said side bar.

4. The combination, with the side channel bars of an automobile, of a bumper provided with brackets, means comprising hooked bolts for engaging said side bars to secure the brackets thereto, one of said bolts having a pointed end to pierce the mud apron during the attachment of the brackets to said side bar, and means for adjusting one of said bolts with respect to the other to permit said brackets to be attached to side bars of varying curvatures.

5. The combination, with the side bars of an automobile, of a bumper provided with brackets, upper and lower clamping members for securing said brackets to said side bar, a circular lock plate adjustably secured to said bracket, said lower clamping member being relatively fixedly secured to said lock plate for adjustment with respect to said upper clamping member.

6. The combination, with the side bars of an automobile, of a bumper provided with brackets, upper and lower clamping bolts for removably clamping said brackets to said side bar, each of said brackets having a circular aperture in the lower portion thereof through which said lower clamping bolt passes, a circular lock plate having an adjustable interlocking engagement with said bracket adjacent said aperture and provided with an eccentrically disposed aperture through which said lower clamping bolt passes whereby the position of said bolts may be varied to permit said bracket to be attached to side bars of varying curvatures and depths.

In testimony whereof I affix my signature.

FRIEDRICH LEDERER.